June 26, 1956 A. C. PETERSON 2,752,110
VARIABLE WING AIRCRAFT
Filed July 11, 1951 4 Sheets-Sheet 1
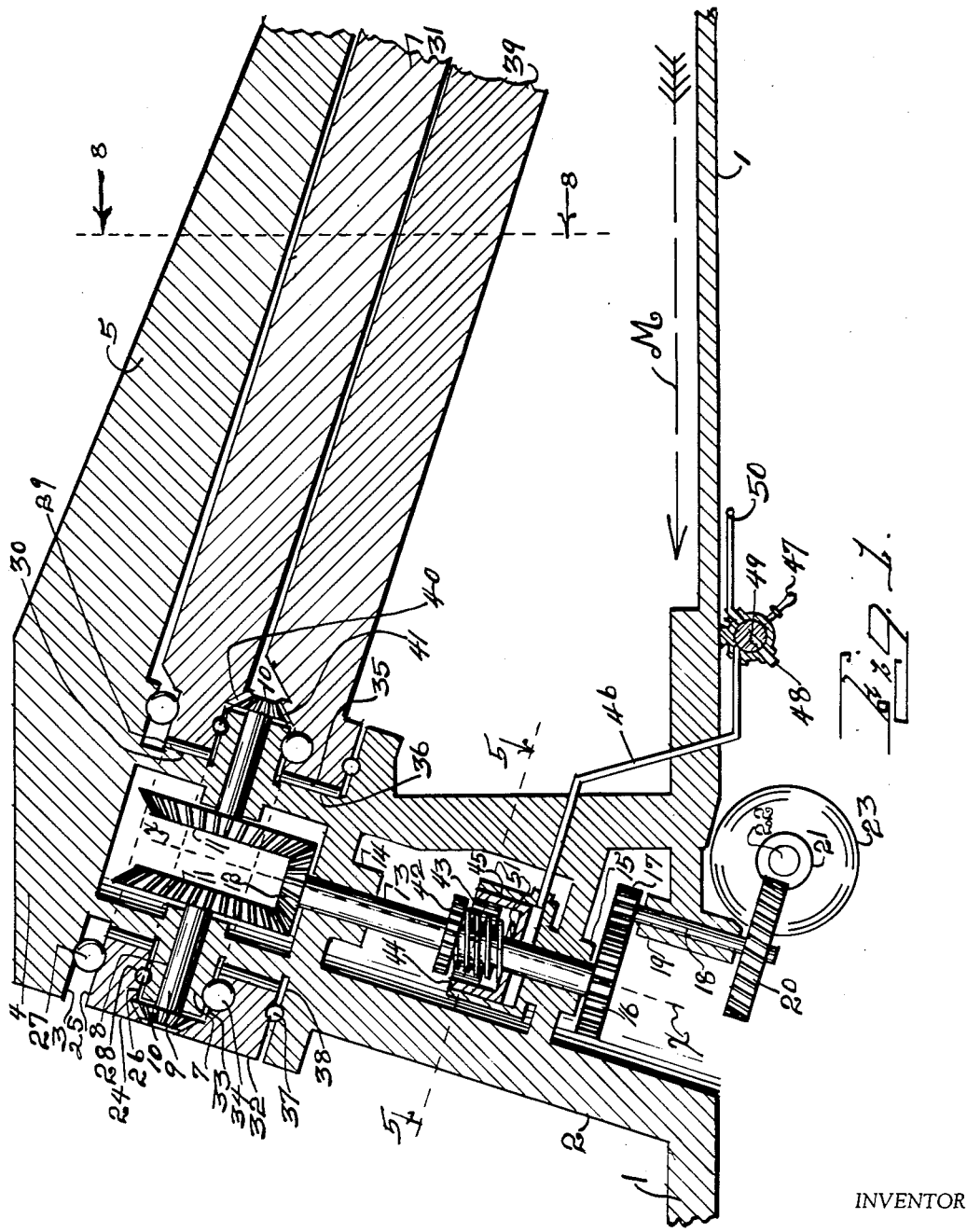
INVENTOR
Adolph C. Peterson

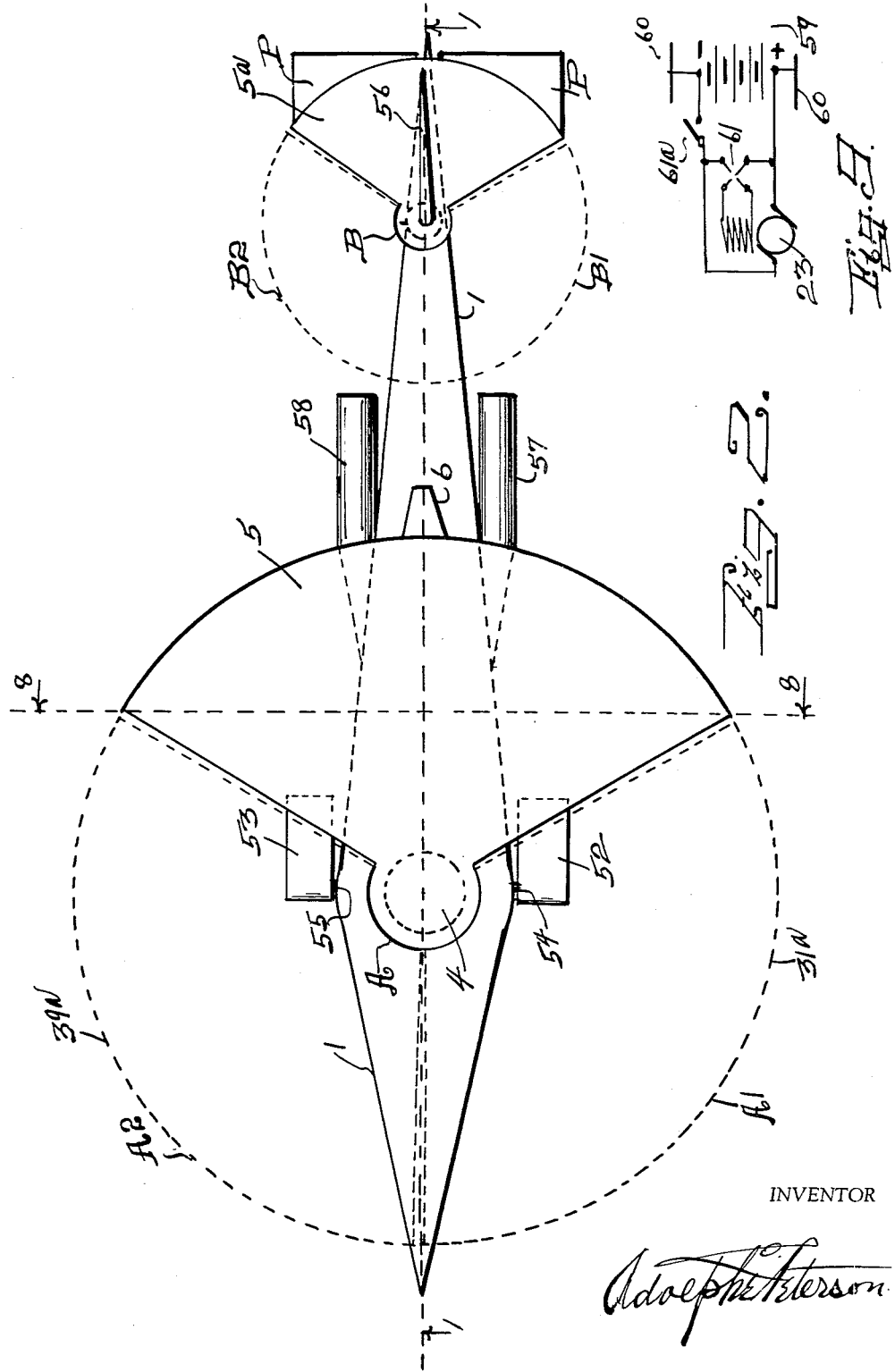

June 26, 1956 A. C. PETERSON 2,752,110
VARIABLE WING AIRCRAFT
Filed July 11, 1951 4 Sheets-Sheet 3
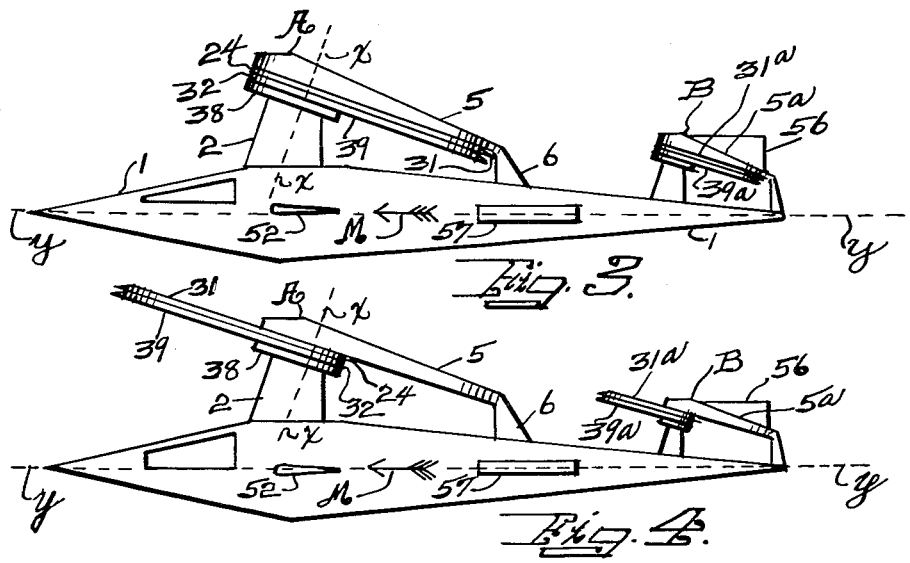
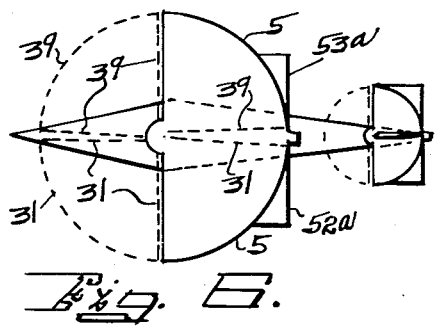
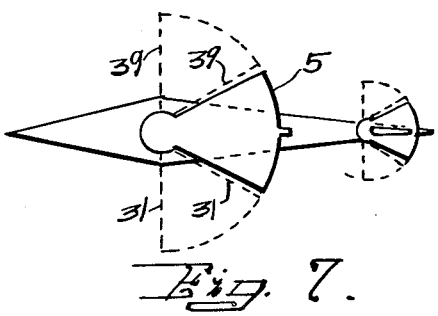
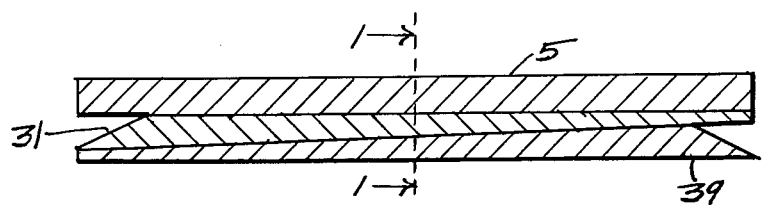
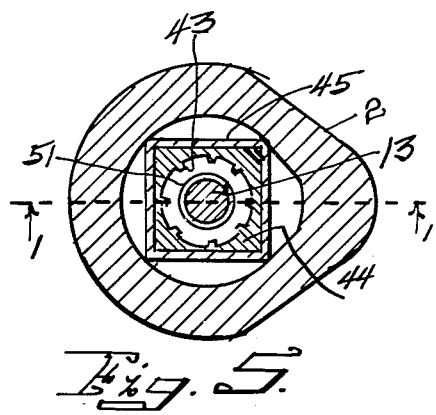
INVENTOR
Adolph C. Peterson.

INVENTOR
Adolph C. Peterson.

United States Patent Office 2,752,110
Patented June 26, 1956

2,752,110

VARIABLE WING AIRCRAFT

Adolphe C. Peterson, Edina, Minn.

Application July 11, 1951, Serial No. 236,163

6 Claims. (Cl. 244—43)

My invention relates to aircraft and especially to a form of aircraft which may have variable lifting surface in flight, and it is therefore called variable wing aircraft.

The principal objects of my invention are to provide a form of wing sustentation means for aircraft, which means is relatively cheaply manufactured while at the same time having a capacity for variable exposure of wing surface to air in flight, so that it may have relatively large or broad wing sustentation surface for take off and landing or emergency use and may have relatively small or narrow wing sustentation surface for high speed flight or cruising flight in air. A chief object is to provide such a means in a form which is relatively strong in the high speed flight, as in supersonic flight, while at the same time being expansible into a broad surface wing, for use in special conditions, when not in high speed flight. An object is to provide such a means in a form such that the operating means is simple and would not be troublesome in use. An object is to provide such a means of variable wing surface in a form of such simplicity that it may be used in ordinary small aircraft for civilian private use, or in large aircraft for commercial use. An especial object is to provide such a means for aircraft of the very high speed, suspersonic speed type, which are desired for use by the army or navy for warfare, where the capacity for reduction of the exposure of wing surface to air in flight, is especially expedient to enable the attainment of the greatest speed of an aircraft with the smallest expenditure of power for attainment of that speed. In general the object is the provision of variable wing sustentation means for the improvement of the flight qualities of aircraft, especially aircraft of the military and other high speed type.

The principal devices and combinations of devices comprising my invention are as hereinafter described, and as claimed in the appended claims.

In the accompanying drawings, which illustrate my invention in several different forms, like characters refer to like parts in so far as practicable. Referring to the drawings:

Figure 1 is a view in vertical section on a plane longitudinally and centrally of an aircraft, through the axial center of the operating elements, of one of my variable wing devices, such as may be applied to an aircraft, the wing sections and the fuselage sections being broken away, in order that the essential operating elements and control means may be illustrated in larger detail. This section is a section on the lines 1—1 of Figures 2, 5, and 8. Figure 5 is on the same scale as Fig. 1, but Figure 2 is on a scale considerably smaller than that of Figure 1.

Figures 3 and 4 are, both, side views of an aircraft embodying my device, that is side views of the aircraft shown in Figure 2, and in part in Figure 1, but these views Figures 3 and 4 are on a scale approximately one-half the scale of Figure 2. Figure 3 shows the side view of the aircraft in high speed condition and flight, and Figure 4 shows the side view of the aircraft in the expanded condition of the wing means, that is for slow speed flight.

Figure 6 is a plan view of an aircraft, on a scale approximately one-half that of Figures 3, 4, and showing a modified form of the wing means, wherein the fixed wing is approximately one-half a circle, and the supplementary sections are each one-quarter of a circle.

Figure 7 is a plan view of an aircraft, on a scale similar to that of Fig. 6, and showing another modified form of the wing means, wherein the fixed wing is approximately one-sixth of a circle in area, and two supplementary sections, are each one-sixth of the area of the same circle.

Figure 2 is a plan view of the aircraft partly shown in Figure 1, this figure showing in solid lines the wing structure as it is in high speed flight condition, and showing in dotted lines, the positions which are occupied by the supplementary wing sections, in slow speed flight, for take off or landing conditions, or emergency conditions.

Figure 5 is a detail section on the line 5—5 of Figure 1, that is on a plane transversely of and at right angles to the axis of the operating shaft of the operating means.

Figure 10:
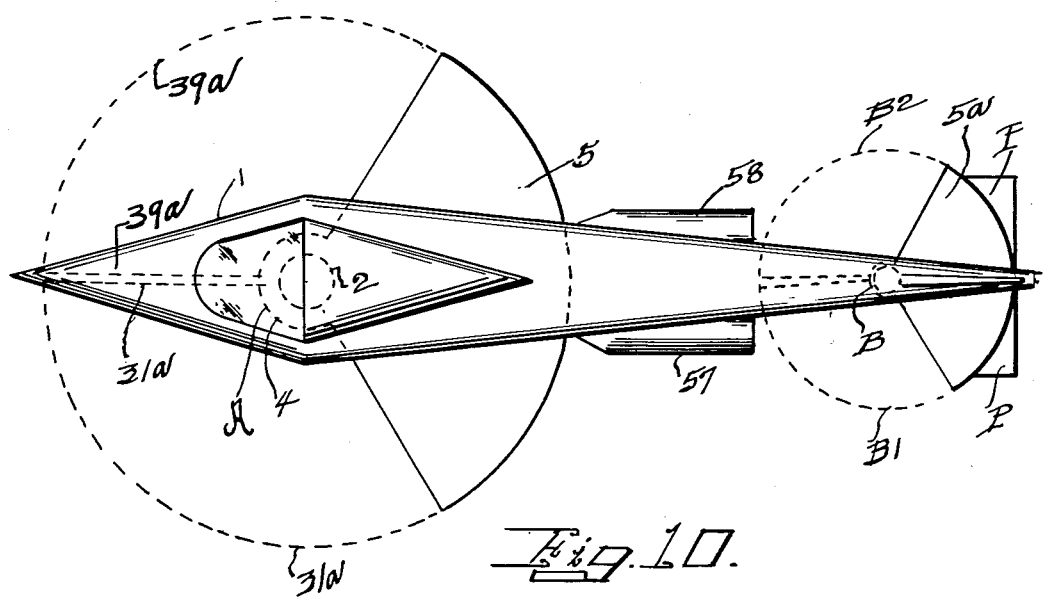
Figure 11:
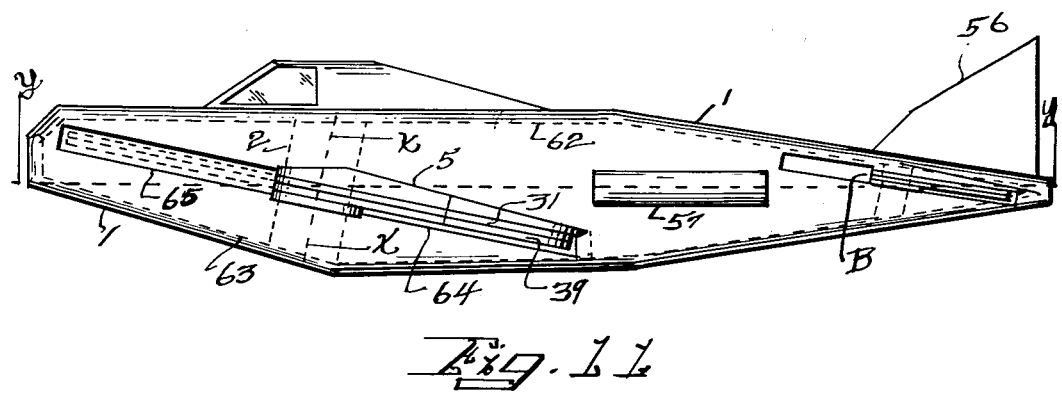

Figure 8 is a section on a vertical plane, on the line 8—8 of Figure 2 (approximately the line 8—8 of Figure 1), to show one form which the section of the wing sections may have to procure improved sustentation in the slow speed condition, that is the expanded condition of the wing sections. In Fig. 8, the sections are shown in the high speed condition, that is the closed or collapsed condition, and in Figure 1, the wing sections are likewise shown in that closed condition. Figure 9 is a circuit diagram. Figures 10, 11, show a modified form of mounting of my novel wing structure or means.

Referring first to the form of my device which is shown in Figures 1, 2, 3, 4, 5, and 8, and with especial reference to Figure 1, which shows the detail construction of the wing means, 1 designates the fuselage of an aircraft embodying my device, 2 is a pylon or narrow wing supporting tower fixed on or formed with the fuselage 1, and having sufficient strength for the function which is hereafter described. The pylon 2 has formed with or firmly attached to it at its extreme top a bearing race which is formed so that it is substantially at right angles to the axis of the pylon or tower 2. The bearing race is designated 3 and has formed with it or secured to it the extreme forward end 4 of a so-called Delta wing 5, the latter being the type of wing which is commonly called the swept wing type of wing, that is the leading edges sweep backwardly from the extreme forward tip or tips of the wing. In the drawing, Figure 2, this Delta wing or swept wing 5 is so shaped that its extreme forward tip 4 is at the forward or tip end, that is, the axis of a circle area of which the Delta wing or swept wing occupies one-third. The line 1—1 in Figure 2 is the longitudinal vertical central plane of the fuselage and the axis of the circle is in that plane and the Delta wing or swept wing 5 is so placed and fixed that its sweep extends through 120 degrees of that circle, and one-half of the wing sector, the swept wing lies at one side of the line 1—1 and the other one-half lies at the other side of the line 1—1. The swept wing 5 at its extreme rear end is fixed to the fuselage 1 by a fixture 6 which as shown in Figures 2 and 3 and 4, firmly connects the rear edge of the swept wing 5 with the top of the fuselage 1, at that rear end of the wing 5. The swept wing 5, which is otherwise called the fixed wing section, is firmly fixed with relation to the fuselage 1 by means of the tower 2 and the fixture 6, and therefore has no rotation or oscillation with relation to fuselage 1.

The tower 2 has formed with it or firmly secured to it by any means, another bearing race 7, which may be called intermediate bearing, and this bearing race 7 is parallel to bearing race 3 and is at right angles to the axis of the tower 2. The bearing race 7 has formed in its mounting means or material two or more opposite bearing bores, each denoted 8, which bearing bores are each placed at one side of the axial center of tower 2 and their axes extend at right angles from the axial center of the tower 2. Each bearing bore 8 has rotatably mounted in it a short shaft, each denoted 9, and each of the latter bears at its outer end bevel gears, each denoted 10, and each shaft 9 at its inner end, bears near the axial center of tower 2, large bevel gears, each denoted 11. The two bevel gears 11 are in permanent engagement with an intermediately placed small bevel gear 12 and the latter is fixed on the extreme upper end of a shaft 13. The shaft 13 is mounted in bearings 14, 15, to rotate in the axial center of tower 2, and at its extreme lower end has fixed on it the large spur gear 16 which is in permanent engagement with the small spur gear 17. The spur gear 17 is fixed on shaft 18 which is mounted in bearing 19 and has large worm wheel 20 fixed on its lower end. The worm wheel 20 is in permanent engagement with worm pinion 21 which is fixed on electric motor shaft 22 and may be driven in either direction by electric motor 23. The latter is controlled as hereinafter described.

There is mounted between the bearing race 3 and the bearing race 7 a wing section mounting 24 which on its upper side has bearing face 25 and on its lower side bearing face 26. This mounting 24 is separated by the ball bearing 27 from race 3 and by the ball bearing 28 from the intermediate bearing race 7, and it has a roller bearing 29 between it and the bearing face 30 about the adjacent portion of tower 2, so that the wing section mounting 24 is thus mounted for oscillation or rotation about the axis of tower 2 but so that the movement about this axis is very easily procured, that is without friction. The wing section mounting 24 has formed with it or very firmly secured to it a wing section 31 which in its lateral sweep or breadth is exactly the same and exactly as large in every direction, laterally, as the lateral sweep or breadth of the fixed wing section, or Delta wing 5. When the wing section 31 is in the position shown in Figure 1, and Figures 3 and 8, it lies completely under the Delta wing or fixed wing section 5, and as close to its underside as the construction will permit, and as movement, for other conditions, will permit. It lies so close that little or almost no air passage between them is permitted. Its shape is otherwise described hereinafter.

On the underside of the intermediate race 7 and about tower 2, there is mounted another wing section mounting 32, which by its upper bearing face 33 and ball bearing (or other bearing) 34 bearing upwardly against intermediate race 7, and which by its roller bearing 35 between it and the exterior cylindrical face 36 of tower 2, is mounted to be oscillable or rotatable on the tower 2, as hereafter described. A smaller ball bearing 37 separates the wing section mounting 32 from the bearing race 38 which is formed with or secured to tower 2 under wing section mounting 32. The wing section mounting 32 has formed with it or very firmly secured to it a wing section 39 which in its lateral sweep or breadth is exactly the same and exactly as large in very direction, laterally, as the lateral sweep or breadth of the fixed wing section, or Delta wing 5. When the wing section 39 is in the position shown in Figure 1, and Figures 3 and 8, it lies completely under the Delta wing or fixed wing section 5, and as close to its underside as the construction will permit, and as movement, for other conditions, will permit. It lies so close that little or almost no air passage between is permitted. Its shape is otherwise described hereafter.

The bevel gears 10 are each in engagement, on the upper side, with a bevel gear 40 formed on the underside of the wing section mounting 24, and are each in engagement on the underside, with a bevel gear 41 formed on the upper side of the wing section mounting 32, and each of the bevel gears 40 and 41 have their axes of rotation identical with the axis of tower 2 and the shaft 13. Rotation of the small bevel gears 10 by means of the gears 11, the gear 12, shaft 13, gears 16, 17, and electric motor 23, and worm wheel 20, will thereby cause the wing sections mountings 24 and 32 to rotate about the axis of tower 2, in opposite directions, so that by this rotation oppositely the wing sections 31 and 39 are moved from their positions under fixed wing secttion 5, in opposite direction away from that position but in the circle about the axis tower 2. Continuation of this rotation, through approximately 120 degrees for each section, will place the sections 31 and 39 in the positions shown by the dotted lines 31a and 39a, respectively, in Figure 2, and in this so-called expanded condition, the three wing sections 5, 31, 39, will together occupy the complete area of the circle about the axis of tower 2, as formed by the extreme outer edges, radially, of the sections. Reversal of the electric motor 23 would cause the reverse movement of the wing sections 31 and 39, and restore them to the positions shown in Figure 1, that is under the fixed wing section 5, which is the position in full lines in Figure 2.

It will be noted that the axis of shaft 13 and of tower 2 lies in the vertical plane which is longitudinally and centrally of the fuselage 1, but that the axis of shaft 13 and tower 2 is inclined rearwardly in that plane, so that the top of that axis lies rearwardly of the lower end of that axis in the said vertical plane. Since the wing section mountings 24 and 32 swing about that rearwardly inclined axis, the wing sections 31 and 39 attached to the mountings 24 and 32, will have their rotation about that axis, in the horizontal planes (slightly separated), which are in their fore and aft directions, inclined to the longitudinal and horizontal axis Y of the fuselage 1, and are not therefore horizontally parallel to the longitudinal axis of fuselage 1 or its direction of flight. This inclination to the horizontal direction, will be that which is calculated to be the most efficient for flight sustentation in all conditions of operation, and may be say from five to ten degrees or more or less than that, as deemed necessary, away from the horizontal axis of the fuselage and the direction of normal flight of fuselage 1. This inclination in any construction will be that which results in the most efficient flow of air to provide sufficient sustentation for the aircraft under all the conditions, and the variable positions of the wing means.

In Figure 8, which is the section transversely of the wing sections 5, 31 and 39 as they lie in the closed position or condition shown in Figure 1, and Figure 8, one form of construction of the wing sections 31 and 39 is shown, which will result, when the wing sections 31, 39, are in the expanded positions, in a shape somewhat similar to that commonly used in aircraft wings. The wing sections in their closed position, as shown in Figure 1, and full lines Figure 2, will together form the general airfoil form which is commonly used in aircraft, having a somewhat thicker vertical section near the leading edge than near the rearward end and having a leading edge shaped to procure the necessary flow of air for sustentation. It will be noted in this connection, that the wing means in its closed condition is contemplated to be used at high speed flight near sonic or even in supersonic speed, and that in such high speed flight, the closed wing means will have that general form in lateral shape and also in respect of wing thickness and shape in the direction of flight which will best contribute to high speed and high speed sustentation in flight.

The shaft 13, see Figure 1, has a small spur gear or dog-clutch 42 fixed or formed on it, and this gear 42 may, when the desired condition of the wing sections is attained, by motor 23, be engaged by the internal gear 43 (or clutch) internally of a square shaped piston 44, the latter being square externally while being cylindrical internally. The piston 44 is movable axially of shaft 13 but is not engaged to shaft 13 and is slidable internally of the square chamber 45 which latter is formed with or fixed to tower 2 internally thereof, near the lower end of shaft 13. The chamber 45 may be filled with air under compression or have release of air to conduit 46 and the latter may deliver compressed air from any source or release air from chamber 45, as controlled by hand valve 47, the release port 48 providing for release of air, the conduit 49 in the valve 47 providing for the alternative connections. Air under compression is delivered from any source (not shown) by means of conduit 50. The coil spring 51 normally keeps piston 44 lowered, but the piston may be elevated at any time to cause internal clutch 43 to engage clutch 42, this providing for locking of the wing sections in either of its positions.

Referring to Figure 2 and Figures 3, 4, it will be seen that there is one unit such as has been described and which is generally designated as A, mounted somewhat forwardly of the center of the longitudinal length of the fuselage 1, and that this is the major sustentation wing of the aircraft. This unit is in all respects as has been described above as a unit of my device. There is also mounted on the aircraft as shown in the designated figures, another small one of the units as described which is denoted B. This latter unit is much smaller than the unit A, and is comparatively of the size of the customary rear stabilizer fin or wing of aircrafts. In this case however, unit B has all the characteristics of the unit described as in Figures 1, 5, 8, that is it has the expandable wing sections 31a and 39a as in those figures, illustrated, and the operating means for positioning the wing sections 31a and 39a, all of this operating means and its control being individual to it and associated with it. The wing sections of unit B are shown, as in their expanded positions, by dotted lines B1 and B2, designating the wing sections or their positions, as expanded. The full line shows the position of the fixed wing section of unit B designated 5a.

The wing sections 31 and 39 or their positions, as expanded, are designated as A1 and A2, in Figure 2. In Figure 3 the relative positions of the sections of unit A are shown in full lines, and in their closed positions, the positions for high speed flight. In this figure the sections of unit B are similarly shown, by the full lines, as in their closed or high speed positions. In Figure 4 the wing sections of unit A and also of unit B are all shown in their expanded or slow speed, that is landing or emergency positions. The aircraft may have auxiliary airfoils or ailerons for horizontal stabilizing or directional control, each mounted at one side of fuselage 1 and designated 52, 53, each fixed on shafts or axles 54, 55, respectively, so as to be independently variably inclined to the horizontal, for control, the control means being of any type as well known and commonly employed, and such means is therefore not shown. Likewise the aircraft has at its rear other horizontal stabilizers or elevator ailerons for directional control P, in the vertical plane, and also has the vertical rudder fin 56, also controllable by any of the commonly known means, for steering in the horizontal plane, the control therefore not being particularly shown. The aircraft has turbine jet engines for propulsion, fixed on its sides, designated 57, 58. The means for control of the electric motor 23 is shown in the diagrammatic circuit in Figure 9, this providing for supply of current by any means as a storage battery 59, or main lines 60 of any electric generator circuit of the aircraft, the generator being not shown, by closing switch 61a the direction of rotation motor shaft 22, being determined by switch 61. The electric motor 23 has one field coil providing for one direction of rotation and another field coil providing for the opposite direction of rotation of the armature, and either of these field coils is includable, alternatively, in the motor circuit by means of switch 61, as shown in Figure 9, to provide either direction of rotation.

It will be seen in the figures, that the rear edges of wing sections 31, 39, as in closed positions, become in approximately one-half of its portion leading edges when in the expanded positions. As shown in Figure 8 the leftward edge of one section is formed to be a leading edge and the rightward edge of the other wing section 31 or 39, is formed to be a leading edge, that is in expanded positions. This is one relative form of the wing sections, but any form suitable, to provide the necessary sustentation may be used. In this connection, it should be noted that the plane in which the fixed wing section 5 lies and the planes (close together) in which wing sections 31, 39, lie, and rotate, are inclined to the direction of flight, such that in all positions, the effect of inclined wings is obtained. The horizontal arrows M in the figures show what is the horizontal or normal direction of flight, and the wing sections 31 and 39 in Figures 1 and 3 and 4, are shown as inclined to the horizontal direction by an angle which is shown as rather larger than would commonly be employed, for explicit showing in the drawings that there is this angle of inclination, such as ordinarily contributes to the attainment of sustentation in aircraft. This angle might in constructions of my device, be say from five to fifteen per cent as may be determined to be most suitable and efficient for any planned construction.

The aircraft in use may be caused to take off with the wing sections in the closed positions, if the runway is long, or may be caused to take off in the expanded positions if the runway is short, or other conditions require it. If desirable, the pilot places switch 61 to send current to motors 23 of each unit A and B, so that the wing sections are moved to positions A1, A2, and B1, B2, the expanded positions. In this operation the large reduction from motor shaft 22 to the gears 10—11, and to the wing mountings, will procure large driving force to rotate the wing sections on their axis, and they will therefore be forced into the expanded positions. After taking off, the pilot may climb the aircraft to the desired elevation, and for high speed flight, may then cause motors 23 of units A and B, either separately or conjointly, to move the wing sections 31 and 39, of the units A and B to the closed positions, the reversing switch 61 being placed to procure the reversing movement of the shafts 22 of the motors 23. Thereby the wing sections 31, 39 of each unit are placed in the positions trailing from the axis of the units, and closely placed under the fixed wing sections 5 or 5a, and thereby the units A and B operate as single closed wing means. In the closed positions, wherein all sections of unit A are in the position shown by full lines in Figures 1 and 2, and the sections of unit B are also similarly placed, there is the minimum of wing surface exposed to air in flight, and the minimum breadth of wing surface, and the wing means functions, as a single wing of Delta, or swept wing shape, and high speed of the aircraft is therefore thus facilitated. For landing or other emergency, the pilot may in flight, cause the motors 23, by means of switch 61, to rotate shafts 22, so as to expand the wing sections 31, 39 of each unit, to expanded positions, and in this expanded condition, the wing units A and B, are each of substantially circular shape, occupying a circle, as large as the circle shown by the full line and dotted lines of the wing sections in Figure 2, and thereby large wing surface is exposed to the air, and all of this surface at the proper inclination for sustentation, and thereby large sustentation effect at slow speed will be attained. It should be noted that the pilot may by any means as supplied with the engines, reduce the speed of flight as he expands the wing sections, but it may be noted, that larger power effect will be required with the larger wing surface, in slow speed flight, than would be the case if the closed positions were retained, and this increased power production is available to procure the sustentation through the greater wing area exposed to air in the slow speed condition, the expanded condition.

Referring to Figure 6, which shows an aircraft having a somewhat modified form of my device mounted therein, this form of the device is in its operating features, namely the means which moves the wing sections into their alternative positions, similar to the first form shown. But in this form, the fixed wing section (the Delta wing of the first form), is in lateral area, one-half of the area of the circle about the axis of tower 2 and shaft 13, that is exactly, or approximately, a semi-circle. Each of the wing sections 31 and 39, fixed respectively to wing section mountings 24 and 32, are in this form a quarter circle in area, and in the closed condition, the one section 31 lies under the one half of the area of fixed wing section 5 which is leftwardly of the longitudinal center plane of the fuselage 1, looking leftwardly in Fig. 6, and the other section 39 lies under the other one half of the area of the fixed wing section 5 which is rightwardly of the center plane of the fuselage 1, looking leftwardly in Figure 6. In the expanded condition, the movable wing sections 31 and 39 lie in the positions shown by the dotted lines 31 and 39, Figure 6, that is in the two quarters of the area of the circle forwardly of fixed wing section 5, and they thus complete the area of the circle about tower 2 and shaft 13. In this form ailerons 53a, 52a are shown mounted at the rear edges of the fixed wing section 5. The rear stabilizer unit B is of the same modified type of wing sections.

Referring now to Figure 7, which shows an aircraft having a somewhat modified form of my device, mounted thereon, this form is in its operating features, that is the means which places the wing sections 31 and 39, in their alternative positions, similar to the same means of the first form shown. In this form, however, the fixed wing section 5 (a Delta wing), is in lateral area only one-sixth of the area of the circle about tower 2 and axis of shaft 13, and each of the movable wing sections 31 and 39, is also one-sixth of the area of that circle, so that when expanded the three sections, as shown by the full lines and the dotted lines 31 and 39, occupy one half of the area of the circle about the said axis, and as placed in the expanded condition, the three sections form substantially a semi-circle. In the closed positions, the wing sections 31 and 39 in this form lie one under the other as in Figure 1, and the three sections, superimposed, as in Figure 8 and Figure 1, form a single Delta wing of an area, one sixth of the circle about the said axis. The Delta wing formed is thus in this form of more pronounced swept wing type. The rear stabilizer unit B may be of the same type.

In either of the modified forms of the wing sections, the wing sections, which are movable, are affixed to their mountings, 24 and 32 in such a way as may be necessary to secure the modified structure. For instance, for the structure as shown in Figure 6, where the two sections lie under different portions of fixed wing section 5, they may lie in exactly the same plane, a plane slightly under the plane of the lower side of fixed wing section 5, and the portions of the wing section immediately adjacent the mountings 24 and 32, respectively, may be bent as necessary to secure this location in the same plane, while still having their mountings, as shown in Figure 1. In any of the forms, all the wing sections, are made such as to be as efficient as possible at slow speed expanded condition, while at the same time being most efficient at the high speed condition, wherein the movable wing sections lie under the fixed wing section 5, and form virtually a part of that wing section, in so far as air flow, is concerned, during high speed flight.

The locking means 42, 43 may be used by the pilot at any time to securely lock the wing sections in place, but this may be dispensed with as the pilot may desire, or may even be omitted from the structure, if desired, the form of the worm pinion 21 and worm wheel 20 being depended on to fix the sections in any condition. Any other means may be utilized in addition, to secure strong fixing of the wing sections, for either condition of flight.

Any other type of motor means for turning the shaft 13, in either direction, may be utilized, as for instance pneumatic or hydraulic types, such as are commonly employed for servo applications. The main sustentation unit A is shown as mounted by its tower 2 in the centrally vertical plane of the fuselage, and above it, but any other placing of the device may be adopted, especially in such constructions, as may have two or more of the devices A, and as illustrated in Figures 1, 5, 8.

While I have shown particular devices and combinations of devices in the illustration of my invention, I contemplate that other detailed devices and combinations of devices may be utilized in the realization of my invention, without departing from the spirit and contemplation thereof.

Referring now to Figures 10 and 11, which show a modified form of mounting of the device in an aircraft, these figures include a device of the general type of that shown in Figures 1, 2, 5, and 8, but in this form the device is mounted on a tower or bearing structure 2, which is fixed approximately in the level of the longitudinal axial center line or plane, horizontally, of the aircraft, and is not mounted somewhat above the aircraft fuselage, as in the first form described. In this modified form, the fuselage frame has the bearing structure 2 fixed between its upper frame 62 and its lower frame 63, so that the bearing structure 2 has its axis X—X in the central vertical plane of the aircraft, but inclined backwardly in that plane, so that the top of that axis is rearwardly of the bottom end of that axis, and thus the movable or oscillable wing sections 31 and 39 swing in a plane or closely adjacent planes, which are substantially at right angles to that axis X—X, and when so swung these sections will present wing foils or means which is angular to the direction of flight of the aircraft, and will function, as sustentation wings generally function. The oscillable wing sections 31 and 39 swing into a slot 64 in the fuselage structure rearwardly of the axis, and inclined as the wing sections are, when moved into the closed, rearward positions, and when swung in the reverse direction, they swing at their adjoining edges into the forward part of that slot in the fuselage, designated 65. The wing sections may be made of such lateral breadth that they swing against the fuselage at the forward location, the slots 65 being then omitted if desired. The wing sections swing into positions 31a and 39a, as shown by dotted lines in Figure 10. The sections are moved by operational means, as in the first form, and they function similarly. In some constructions this modified mounting may be preferred, for the better streamlining of the aircraft, while in other constructions, the mounting first shown might be preferred, for improved lateral stability of the aircraft, in flight.

What I claim is:

1. In an aircraft, an aircraft frame structure and in combination therewith: an airfoil pivotal bearing fixed on the aircraft frame structure; a fixed wing means fixed on said airfoil pivotal bearing substantially at right angles to the axis of said pivotal bearing and trailing rearwardly from the location of the pivotal bearing, the forward end of the fixed wing means secured at the upper end of said pivotal bearing; a pair of oscillatable wing sections mounted for oscillation on the pivotal bearing to swing oppositely on the axis of the pivotal bearing in planes substantially parallel to and in closely tiered relation with said fixed wing means and at right angles to the said axis of the pivotal bearing to positions stacked under the said fixed wing means in closely tiered relation or to positions circumferentially removed from the said positions under the said fixed wing means; the fixed wing means and the oscillatable wing sections in either position forming substantially one static airfoil, and means interconnected with the oscillatable wing sections to force the said oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

2. In an aircraft, an aircraft frame structure and in combination therewith: an airfoil pivotal bearing fixed in the aircraft frame structure; a fixed wing means fixed on said airfoil pivotal bearing substantially at right angles to the axis of said pivotal bearing and trailing rearwardly from the location of the pivotal bearing, the forward end of the fixed wing means secured at the upper end of the pivotal bearing; a pair of oscillatable wing sections mounted for oscillation on the pivotal bearing to swing oppositely on the axis of the pivotal bearing in planes substantially parallel to and in closely tiered relation with said fixed wing means and at right angles to the said axis of the pivotal bearing to positions stacked under the said fixed wing means in closely tiered relation or to positions circumferentially removed from the said positions under the said fixed wing means, the fixed wing means and the oscillatable wing sections in the stacked position forming one static airfoil of exposed surface area approximating the exposed surface area of the fixed wing means and in the alternative position forming one static airfoil of exposed surface area substantially triple that of the exposed surface area of the fixed wing means and the oscillatable wing sections in the stacked positions; and means interconnected with said oscillatable wing sections to force the oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

3. In an aircraft, an aircraft frame structure and in combination therewith: an airfoil pivotal bearing fixed on the aircraft frame structure; a fixed wing means formed to occupy a sector of the circle about the axis of said pivotal bearing which is substantially of delta form and fixed on said airfoil pivotal bearing substantially at right angles to said axis and trailing one-half of the fixed wing means on one side of the central vertical longitudinal plane through said sector and one-half of the fixed wing means on the other side of said central vertical longitudinal plane and rearwardly from the location of the pivotal bearing; a pair of oscillatable wing sections each of delta form and approximately equal in lateral area and shape to said fixed wing means and mounted for oscillation on the pivotal bearing to swing on the axis of the pivotal bearing in planes substantially parallel to and in closely tiered relation with said fixed wing means and at right angles to the said axis of the pivotal bearing to alternative positions, in the one position stacked under the said fixed wing means, one-half of each of said oscillatable wing sections on one side of said central vertical longitudinal plane and one-half of each of said oscillatable wing sections on the other side of said central vertical longitudinal plane, and in the other position to positions circumferentially removed from the said positions under said fixed wing means, and the fixed wing means and the oscillatable wing sections in the stacked position forming one static airfoil of exposed surface area approximating that of the said fixed wing means and in the alternative position forming one static airfoil of exposed surface area substantially triple that of the exposed surface area of the fixed wing means and the oscillatable wing sections in the stacked positions; and means interconnected with said oscillatable wing sections to force the oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

4. In an aircraft, an aircraft frame structure and in combination therewith: an airfoil pivotal bearing fixed on the aircraft frame structure; a fixed wing means formed to occupy a fractional part of the circle about the axis of said pivotal bearing and fixed on said airfoil pivotal bearing substantially at right angles to said axis and trailing rearwardly from the location of the pivotal bearing, the forward end of the fixed wing means secured at the upper end of the pivotal bearing, one-half of said fixed wing means on one side of the central vertical longitudinal plane through said fractional part of the circle and the other one-half of said fixed wing means on the other side of the said central vertical longitudinal plane; a pair of oscillatable wing sections each approximately equal in area and shape laterally to said fixed wing means and mounted for oscillation on the said pivotal bearing to swing on the axis of the pivotal bearing in planes substantially parallel to and in closely tiered relation with said fixed wing means and at right angles to the said axis of the pivotal bearing to positions stacked under the said fixed wing means in closely tiered relation, one-half of each of said oscillatable wing sections on one side of said central vertical longitudinal plane and one-half of each of said oscillatable wing sections on the other side of said central vertical longitudinal plane or to positions such that said oscillatable wing sections are circumferentially removed oppositely from the said positions stacked under said fixed wing means, the fixed wing means and the oscillatable wing sections in the one position forming one static airfoil of exposed surface area approximating that of the said fixed wing means and in the alternative position forming one static airfoil of exposed surface area substantially triple that of the exposed surface of the fixed wing means and the oscillatable wing sections in the stacked positions; and means interconnected with said oscillatable wing sections to force the oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

5. In an aircraft, an aircraft frame structure and in combination therewith: an airfoil pivotal bearing fixed on the aircraft frame structure; a fixed wing means fixed on said airfoil pivotal bearing its forward end secured at the upper end of said pivotal bearing and to be substantially at right angles to the axis of said pivotal bearing and trailing rearwardly from the location of said pivotal bearing; a pair of oscillatable wing sections mounted for oscillation on said pivotal bearing on co-axial axes co-axial also with the axis of the pivotal bearing in planes substantially parallel to and in closely tiered relation with said fixed wing means and at right angles to the said axis to swing to positions stacked under the said fixed wing means one-half of each of said oscillatable wing sections on one side of the central vertical longitudinal plane through said fixed wing means and one-half of each of said oscillatable wing sections on the other side of said central vertical longitudinal plane or to alternative positions such that the oscillatable wing sections are circumferentially removed from the said positions stacked under said fixed wing means; and means interconnected with said oscillatable wing sections to force the oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

6. All of the means as described and as claimed in claim 5, and in combination in the aircraft: a supplemental airfoil structure including; a supplemental airfoil pivotal bearing mounted in the aircraft frame structure longitudinally rearwardly of the first named pivotal bearing and fixed in the aircraft frame structure; a supplemental fixed wing means having its forward end secured at the upper end of said supplemental pivotal bearing and to be substantially at right angles to the axis of said supplemental airfoil pivotal bearing and trailing rearwardly from the location of said supplemental airfoil pivotal bearing; a pair of supplemental oscillatable wing sections mounted for oscillation on said supplemental pivotal bearing on co-axial axes co-xial with the axis of the supplemental pivotal bearing in planes substantially parallel to and in closely tiered relation with said supplemental fixed wing means and at right angles to the said axis to swing to positions stacked under the said supplemental fixed wing means; one-half of each of said supplemental oscillatable wing sections on one side of the central vertical longitudinal plane through said supplemental fixed wing means and one-half of each of said supplemental oscillatable wing sections on the other side of said central vertical longitudinal plane or to alternative positions such that the supplemental oscillatable wing sections are circumferentially removed from the said positions stacked under said supplemental fixed wing means; and means interconnected with said supplemental oscillatable wing sections to force the supplemental oscillatable wing sections from the one position to the other, the said last named means including, a bevel gear mounted on and secured on the underside of the pivoted end of one said oscillatable wing section and a bevel gear mounted on and secured on the upper side of the other of said oscillatable wing sections, an intermediate gear means between the said bevel gears and in engagement on one side with one said bevel gear and on the other side with the other said bevel gear, and a rotative power driving element in inter-engagement with said intermediate gear means to impart driving rotative torque to said intermediate gear means to rotate it in either direction.

References Cited in the file of this patent

UNITED STATES PATENTS

| | | |
|---|---|---|
| 1,503,950 | Heywood | Aug. 5, 1924 |
| 1,606,117 | Caples | Nov. 9, 1926 |
| 1,622,191 | Filippi | Mar. 22, 1927 |
| 1,823,417 | Weber | Sept. 15, 1931 |
| 1,859,716 | Rutrle | May 24, 1932 |
| 1,983,171 | Harding | Dec. 4, 1934 |
| 2,137,047 | Gliwa | Nov. 15, 1938 |
| 2,501,920 | Steigel | Mar. 28, 1950 |
| 2,659,550 | Peterson | Nov. 17, 1953 |

FOREIGN PATENTS

| | | |
|---|---|---|
| 416,495 | France | Aug. 9, 1910 |
| 826,479 | France | Jan. 4, 1938 |

OTHER REFERENCES

"Flight" Magazine, pub. date July 27, 1951 (vol. LX—issue 2218—page 107).